United States Patent [19]

Sutherland et al.

[11] Patent Number: 4,652,417
[45] Date of Patent: Mar. 24, 1987

[54] FAULT-TOLERANT ANALOG OUTPUT NETWORK

[75] Inventors: James F. Sutherland, Plum Boro; William D. Ghrist, III, Pittsburgh, both of Pa.

[73] Assignee: Westinghouse Electric Corp., Pittsburgh, Pa.

[21] Appl. No.: 699,367

[22] Filed: Feb. 7, 1985

[51] Int. Cl.$^4$ .............................................. G21C 7/36
[52] U.S. Cl. ................................... 376/215; 376/216; 364/492
[58] Field of Search ................ 376/215, 216; 364/527, 364/494, 492, 807, 861, 863, 601, 602

[56] References Cited

U.S. PATENT DOCUMENTS

4,427,620 1/1984 Cook ..................................... 376/216
4,584,165 4/1986 Wilson ................................. 376/216

Primary Examiner—Donald P. Walsh
Attorney, Agent, or Firm—Daniel C. Abeles

[57] ABSTRACT

An analog output network provides multiple communication paths for control of an actuator in response to an input signal. The analog output network includes at least two controllers, each of which is connected to an analog output circuit and a controller selector which is connected to each of the controllers and the analog output circuits. The controller selector ensures that at least one of the analog output circuits is enabled at all times and identifies one of the controllers as an on-line controller. The analog output circuit connected to the on-line controller generates an actuation signal which passes through the actuator and the other analog output circuit. An alternate current path comprising a diode string with a voltage drop larger than the voltage drop of the actuation signal in the other analog output circuit is provided so that if an analog output circuit is removed or defective, the actuation signal from the on-line analog output circuit is still provided with a current path.

28 Claims, 6 Drawing Figures

FAULT-TOLERANT ANALOG OUTPUT NETWORK

BACKGROUND OF THE INVENTION

1. Field of the Invention

The present invention relates in general to an electrical network in which analog signals are used to actuate a device such as a switch, pump or valve; and more particularly, to such an analog network used in activating devices in a pressurized light water nuclear power system.

2. Description of the Related Art

Many applications of electrical control systems require that the electrical control system be highly reliable. For example, whenever an electrical control system is operating in a hostile environment, such as in a nuclear power system or in outer space, the relability of such a control system is of paramount importance. Such reliability is commonly provided by some type of redundancy. Redundant controllers for an actuator are commonly connected in parallel and information is passed between them to prevent a system disturbance when control is switched from one controller to another. The usual method of selecting a controller is to use an electromechanical relay. While electromechanical relays are generally reliable, a relay can fail if its contacts have been damaged during "surge withstand tests", leaving no path for control of the actuator by any controller.

SUMMARY OF THE INVENTION

An object of the present invention is to provide multiple control paths for an actuator of a device, such as a valve.

Another object of the present invention is to provide a current path through redundant analog output circuits in an analog output network, so that each analog output circuit can detect that one of the analog output circuits is in an on-line mode.

Yet another object of the present invention is to provide an alternate current path for actuation of the actuator, so that the actuator can be activated even if the current path through a back-up analog output circuit is defective or unavailable.

A further object of the present invention is to provide a feedback signal in each of the analog output circuits so that analog output circuits which are in a back-up mode do not generate an output signal as long as an output signal is being generated by an on-line analog output circuit.

Still another object of the present invention is to provide a controller for each of the analog output circuits, each controller generating a demand signal for the corresponding analog output circuit and receiving a feedback signal from the corresponding analog output circuit, so that the controller for the on-line analog output circuit can detect a failure thereof via the feedback signal.

A still further object of the present invention is to provide a controller selector in the analog output network which receives a control signal and pulses from the controller of the on-line analog output circuit and generates an enable signal for the on-line analog output circuit and a status signal for the controller of a back-up analog output circuit.

An additional object of the present invention is to provide a controller selector in the analog output network, which receives a control signal and a pulse train from all controllers in the network, supplies a status signal to each controller and an enable signal to each analog output circuit to allow any controller to be selected as the on-line controller and all other controllers to act as back-up controllers.

A further object of the present invention is to provide an analog output network which includes a controller selector divided into mirror image portions, each portion of the controller selector corresponding to a controller in the network, the portions of the controller selector being interconnected but capable of operating independently.

The above-mentioned objects are attained by providing an analog output network for controlling an actuator in dependence upon an input signal received by first and second controllers from a sensor. The controllers are connected to a controller selector for indicating which of the controllers is in an on-line mode and which of the controllers is in a back-up mode. Each of the controllers is also connected to a corresponding analog output circuit which includes actuation means for generating an actuation signal, output terminals, a diode connected to one of the output terminals, and a resistor connected to the diode and the other of the output terminals. The analog output network further includes a first diode string connected to the actuator and the first output terminal of the first analog output circuit and includes a second diode string connected to the first diode string, the second analog output circuit and the actuator.

When a normal operating current flows in either of the analog output circuits through the diode and resistor to one of the output terminals, an expected voltage drop occurs across the diode and resistor. The voltage drop across each of the first and second diode strings is greater than that of the expected voltage drop caused by the normal operating current. Thus, when both analog output circuits are operating normally, the actuation signal current flows from the actuation means in the on-line analog output circuit, through the actuator, through the diode and resistor of the back-up analog output circuit and back to the on-line analog output circuit. If the current cannot flow through the back-up analog output circuit because it has been removed for maintainance or has failed, the current will flow through the diode string which is connected across the output terminals of the back-up analog output circuit.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

Conventional control of actuators in a pressurized light water nuclear power system provides redundancy only for controllers and uses an electromechanical relay as a controller selector. As a result, a failure of the relay, such as that caused by damage to the relay contacts during surge withstand testing, can result in neither controller being selected for use. The present invention solves this problem by using solid state analog output circuits which are connected in a network having redundant current paths to the actuator.

Figure 1:
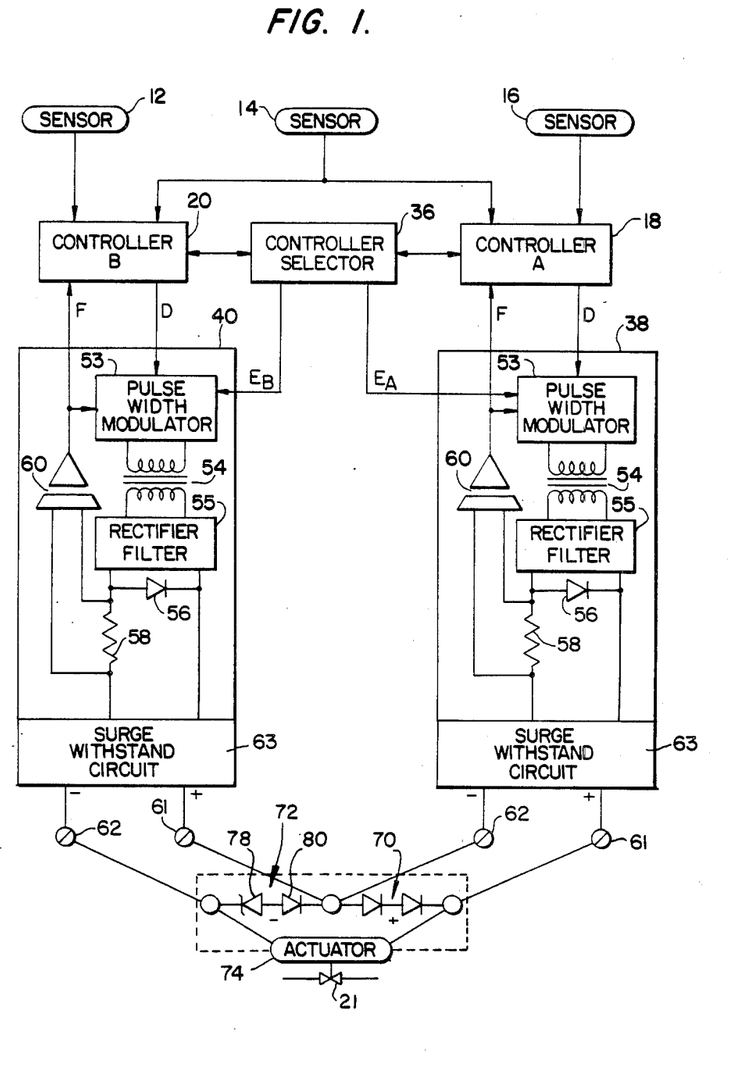
FIG. 1 is a block circuit diagram of an analog output network according to the present invention.

An example of such an analog output network is illustrated in FIG. 1. Sensors 12, 14 and 16 are located at various points in the nuclear power system. Sensor 14 is an example of a shared sensor which provides input signals to both controller 18 and controller 20. Sensors 12 and 16 are examples of redundant sensors both of which sense the same condition, e.g., temperature at a location in the nuclear power system, and each of which provide input signals to one of the controllers 18 or 20. In practice, an analog output network according to the present invention may derive its input signals from shared sensors only, redundant sensors only, or a combination, such as that illustrated in FIG. 1.

Figure 2:
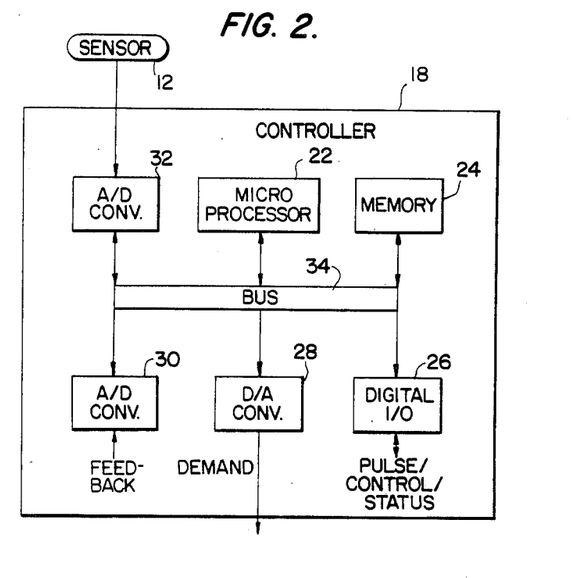
FIG. 2 is a block circuit diagram of a controller 20 or 18 in an analog output network of the present invention.

The controllers 18 and 20 generate demand signals indicating an amount of activation of a device 21 such as a valve. The controller block diagram in FIG. 2 is an example of the construction of controllers 18 and 20, however, any process controller which provides the signals described below can be used. The controller illustrated in FIG. 2 utilizes a microprocessor 22, such as iSBC-286/10 manufactured by Intel Corporation connected to a memory 24, such as iSBC-428 manufactured by Intel. The controller 18 also includes a digital input/output interface 26, such as iSBC-556 manufactured by Intel; a digital/analog converter 28, such as MP8316-V manufactured by Burr-Brown Research Corporation; and analog/digital converters 30 and 32, such as ISV-88/40 manufactured by Intel. The components of the controller 18 are connected via a bus 34, e.g. the Multibus used with the above components.

Figure 3:
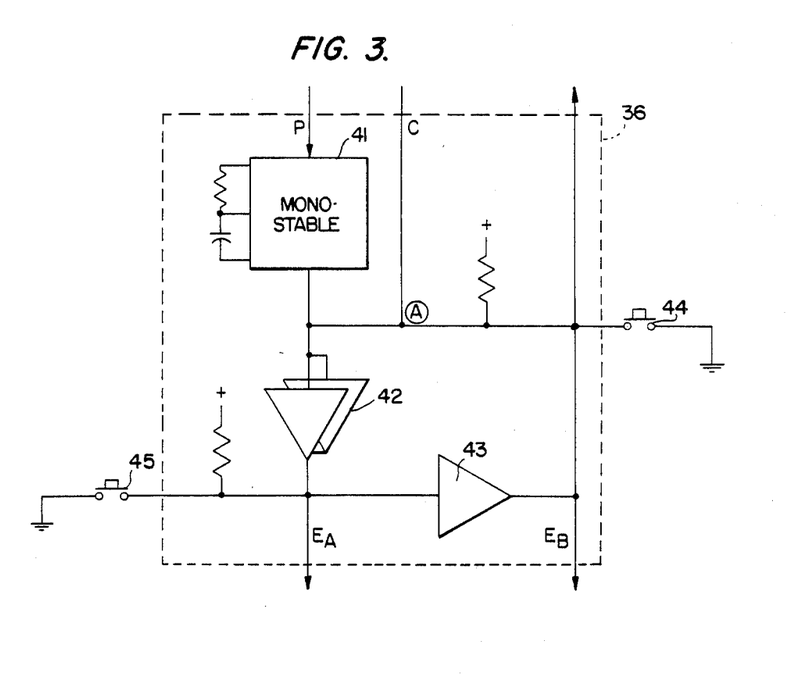
FIG. 3 is a block circuit diagram of a first embodiment of the controller selector 36 in an analog output network according to the present invention.

The controllers 18 and 20 are connected to a controller selector 36 containing solid state components. The controller selector 36 may be a single "keep alive" circuit, such as the circuit ilustrated in FIG. 3, if the controller 18 is pre-selected as a primary controller which is normally in the on-line mode and controller 20 is pre-selected as a secondary controller which is normally in the back-up mode. The keep alive circuit, as illustrated in FIG. 3, typically includes a monostable circuit 41, such as MC1555 manufactured by Motorola, connected to receive pulses P from the digital input/output interface 26 in the primary controller 18. So long as the pulses P are received with the proper timing, e.g. ten pulses per second, by the monostable circuit 41, a high signal, e.g., 5 volts, is provided as an output. A control signal C is also output from the digital input/output interface 26 in the primary controller 18. The control signal C is received at the output of the monostable circuit 41 so that absence of either the control signal C or the output of the monostable circuit 41 causes the voltage at node Ⓐ to drop to a low voltage, e.g., zero volts. Inverters 42 have commonly connected gates so that either can fail and the other will still invert the output at node Ⓐ, whereby when the primary controller 18 is in an on-line mode, an enable signal $E_A$, having a "low true" value, is output by the controller selector 36 to the analog output circuit 38 corresponding to the primary controller 18. An inverter 43 inverts the enable signal $E_A$ to be output as the enable signal $E_B$. A switch 44 is connected between node Ⓐ and ground to force the selection of the back-up controller 20 as the on-line controller.

If the controllers 18 and 20 are not preselected as primary and secondary, respectively, the controller selector 36 must receive pulse and control signals from both controllers 18 and 20 and supply an operating status signal to each controller 18 or 20 indicating the status of the other controller 20 or 18. A controller selector is illustrated in FIG. 4 which supplies such signals.

Figure 4:
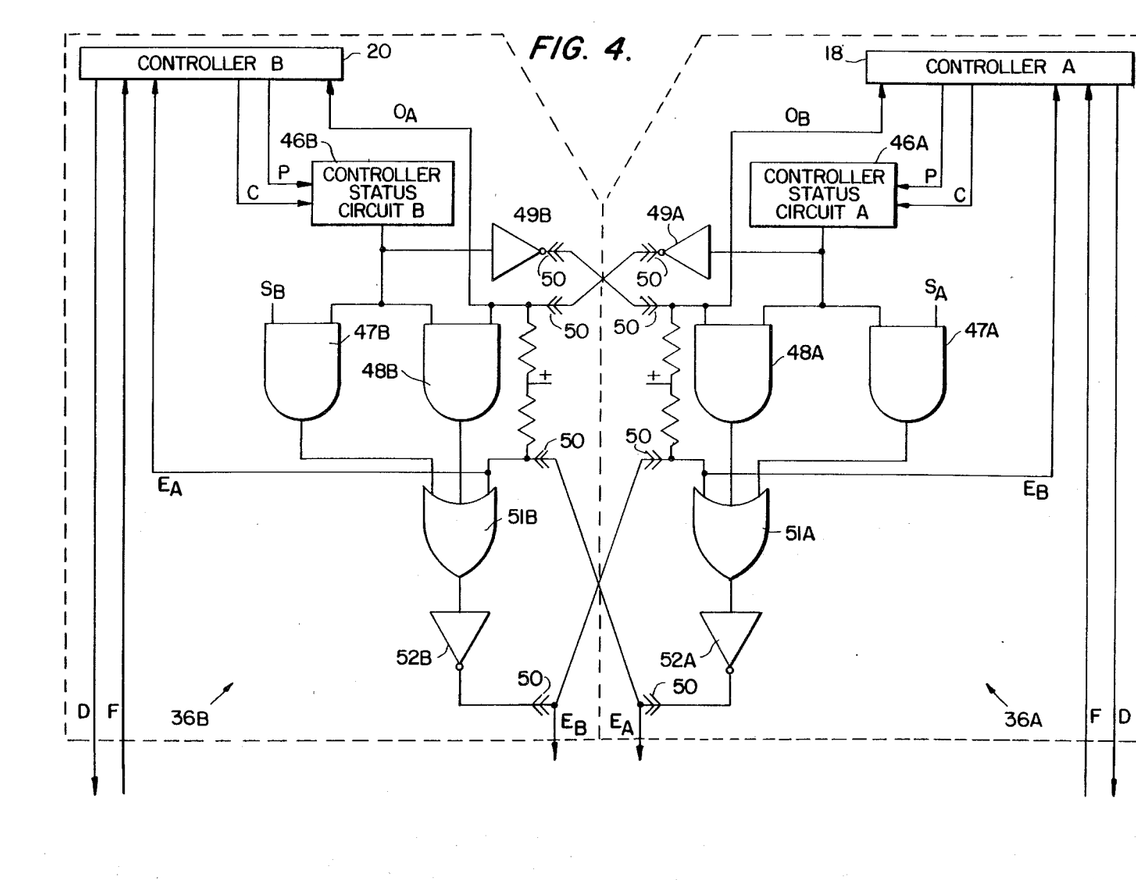
FIG. 4 is a block circuit diagram of a second embodiment of the controller selector 36 in an analog output network according to the present invention.

The circuit illustrated in FIG. 4 includes cross-coupled selector circuits 36A and 36B. The selector circuits 36A and 36B comprise controller status circuits 46A and 46B for each of the controllers 18 and 20, respectively. The controller status circuits 46A and 46B perform the same function as the monostable circuit 41 in the circuit illustrated in FIG. 3. The outputs from the keep alive circuits 46A and 46B are supplied to AND gates 47A, 48A, 47B and 48B. The AND gates 47A and 47B receive select signals $S_A$ and $S_B$, respectively, for example signals generated by normally closed switches. The outputs from the controller status circuits 46A and 46B are also supplied to inverters 49A and 49B which supply an operation status signal $O_A$ or $O_B$ to the other controller 20 or 18 and to the AND gates 48B and 48A, respectively, via cable connectors 50. Thus, the AND gates 47A and 47B indicate that the corresponding controller 18 or 20 is to be selected when a corresponding switch is depressed if the corresponding controller 18 or 20 is operating normally, as indicated by the corresponding controller status circuit 46A or 46B. The AND gates 48A and 48B switch control from an on-line controller, e.g. controller 18, to a back-up controller, e.g. controller 20, when the controller status circuit, e.g., 46A, corresponding to the on-line controller 18 indicates that the controller 18 is no longer operating normally and the controller status circuit, e.g., 46B, corresponding to the back-up controller 20, indicates that the back-up controller 20 is alive.

The outputs from the AND gates 47A, 48A, 47B and 48B are supplied to OR gates 51A and 51B so that either of the above conditions can result in a change in enable status. As illustrated in FIG. 4, the output of the OR gates 51A and 51B pass through inverters 52A and 52B prior to being output as the "low true" enable signals. The enable signals are also fed back to the opposite OR gate 51B or 51A and to the controller 20 or 18 corresponding thereto. The OR gates 51A and 51B and inverters 52A and 52B form a latch circuit which latches an existing pair of signals enabling only one of the two analog output circuits 38 and 40 until there is a change in status caused by depressing one of the switches 44 or 45, a change in status indicated by one of the controller status circuits 46A or 46B, or a circuit failure. The cable connectors 50 indicate the separation of the controller selector 36, illustrated in FIG. 4, into two portions 36A and 36B, each of which is capable of generating an enable signal without inputs from the other portion, and again providing redundant signal generation and signal paths.

The analog output circuits 38 and 40 (FIG. 1) are modified versions of the circuits disclosed in the U.S. patent applicaton by Sutherland and Kenny, entitled "Low Power Dissipation Analog Current Loop Output Circuit", having the same assignee as the present application. As illustrated in FIG. 1, the analog output circuits 38 and 40 each include a pulse width modulator 53 connected to a corresponding controller 18 or 20 and to the controller selector 36. Also included are a transformer 54 connected to the pulse width modulator 53, a rectifier-filter 55 connected to the transformer 54, and a diode 56 connected across the outputs of the rectifier-filter 55. A resistor 58 is connected to one of the outputs of the rectifier-filter 55 and to the diode 56. An electrically isolated amplifier 60, such as an opto-isolated differential amplifier, is connected to the resistor 58 to sense the voltage drop across the resistor 58. The amplifier 60 generates a feedback signal which is supplied to the pulse width modulator 53 and to the corresponding controller 18 or 20. The outputs of the rectifier-filter 55 are connected to output terminals 61 and 62 of the analog output circuit 38 or 40 via the resistor 58 and a surge withstand circuit 63.

Figure 5:
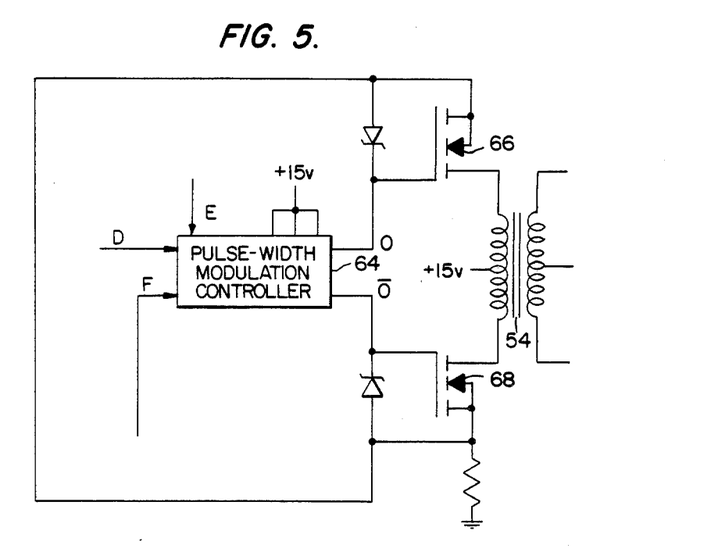
FIG. 5 is a circuit diagram for a pulse width modulator 50 in the analog output circuit of FIG. 1.

The pulse width modulator 53 preferably includes a solid state pulse-modulation controller 64 such as illustrated in FIG. 5. The pulse-width modulation controller 64 is preferably in the form of an integrated circuit such as the regulating pulse modulator identifed as LM3524 and manufactured by National Semiconductor Corporation, or an equivalent integrated circuit. The pulse-width modulation controller 64 receives a demand signal from the corresponding controller 18 or 20 and a feedback signal from the amplifier 60. The modulation controller 64 outputs a pulse train and an inverted pulse train with a duty cycle which increases when the feedback signal is lower than the demand signal. The pulse trains control power transistors 66 and 68 which permit current to flow through the transformer 54.

Figure 6:
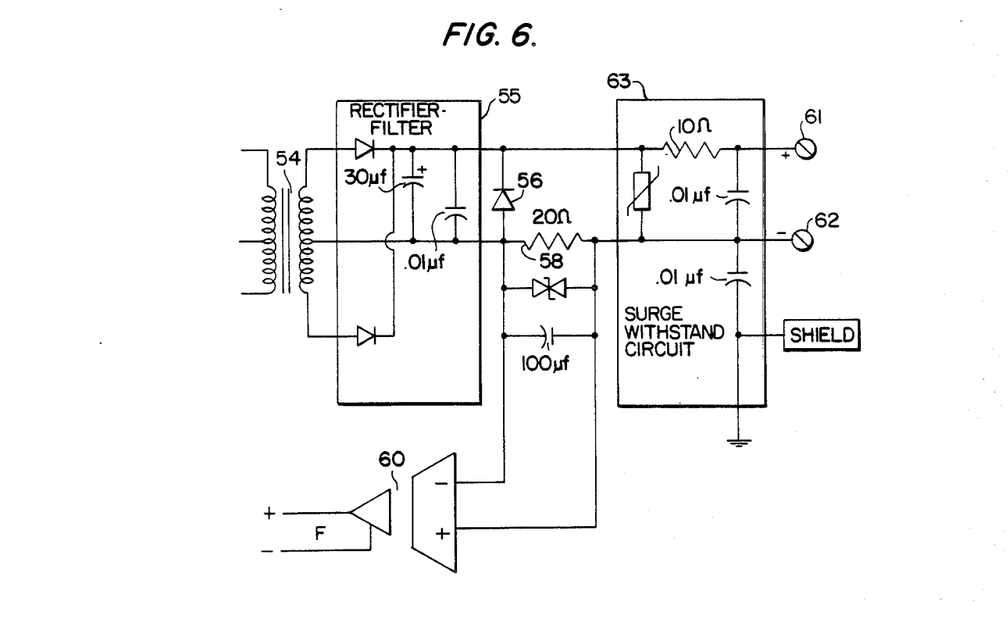
FIG. 6 is a circuit diagram of the remaining portion of the analog output circuit in FIG. 1.

The rectifier-filter 55 and surge withstand circuit 63 are conventional circuits, examples of which are illustrated in FIG. 6. The feedback signal generated by the amplifier 60 indicates the voltage drop across the resistor 58. In addition to providing feedback to the pulse width modulator 53, the feedback signal is also supplied to the corresponding controller 18 or 20. When the feedback signal indicates an irregular voltage drop across the resistor 58, the corresponding controller 18 or 20 ceases to output the pulses and drops the output of the control signal to a "low" value, e.g., 0 volts. Assuming that controller 18 is "on-line", the cessation of the pulse train or a low control signal from controller 18 will cause the controller selector 36 to disable the pulse width modulator 53 in the analog output circuit 38 and enable the pulse width modulator 53 in the analog output circuit 40 while simultaneously indicating the change in status to controller 20.

The output terminals 61 and 62 of the analog output circuits 38 and 40 are connected to diode strings 70 and 72 and to the actuator 74. The actuator 74 may be an electropneumatic positioner or transducer, such as those commonly used in control systems of a nuclear power system to control the operation of the device 21 which may be a pump or valve, etc. Such actuators typically operate with a current of 4–20 milliamperes or 10–50 milliamperes. Thus, the maximum current through the resistor 58 will be 20 or 50 milliamperes, depending on the type of actuator 74 to which the analog output network is connected.

The diode string 72 is illustrated as including a zener diode 78 and a high-power, reverse-bias diode 80, such as a Tranzorb diode manufactured by General Semiconductor Industries, Inc. The zener diode 78 is preferably a low-voltage zener diode with a breakdown voltage of 3–5 volts. An alternative diode string is the diode string 70 illustrated as a series of Tranzorb diodes which have a total forward-bias voltage drop equivalent to that of the zener-Tranzorb combination of diode string 72. While both types of diode strings are illustrated in FIG. 1, an actual analog output network would likely use the same type for both diode strings 70 and 72.

The diode strings 70 and 72 are included to provide an alternate current path for actuation of the actuator 74. Normally, one of the controllers 18 or 20 is in an on-line mode and thus generates a higher voltage demand signal than the controller 20 or 18 which is in a back-up mode. Thus, the analog output circuit 38 or 40, corresponding to the on-line controller 18 or 20, generates an output signal which is desired to pass through the actuator 74 and through the resistor 58 and diode 56 of the back-up analog output circuit 40 or 38. Therefore, the voltage drop across each of the diode strings 70 and 72, must be higher than the voltage drop across the resistor 58 and diode 56 caused by the maximum expected current, e.g., 20 milliamperes or 50 milliamperes. Provided the voltage drop across the diode strings 70 and 72 is sufficiently high, the amplifier 60 in the back-up analog output circuit 40 or 38 will sense a voltage drop across the resistor 58 which is higher than the demand generated by the back-up controller 20 or 18, and thus will prevent the pulse width modulator 53 in the back-up analog output circuit 40 or 38 from generating an actuation signal, even if the enable signal does not have a "high" or "disable" value. Therefore, it would be possible to practice the present invention with a modulation controller which does not have an enable/disable pin; however, the number of communication paths provided by the above embodiment would be reduced.

The above-described analog output network according to the present invention provides multiple communication paths between the redundant portions of the network. In addition to the communication paths from the on-line controller, e.g., controller 18, to the back-up controller, e.g., controller 20, via the controller selector 36 or via a shared memory, e.g., memory 24 (FIG. 2), the analog output circuits 38 and 40 provide an alternate communication path. If the on-line analog output circuit 38 or 40 fails to supply the actuator 74 with an actuation signal, the voltage drop across resistor 58 in the back-up analog output circuit 40 or 38 will drop to zero causing the feedback signal output by the amplifier 60 to drop below the demand signal with the result that the pulse width modulator 50 in the back-up analog output circuit 40 or 38 will turn on and generate an actuation signal. In other words, an actuation signal will be generated by the back-up analog output circuit 40 or 38 to substitute for the actuation signal from the failed analog output circuit 38 or 40.

If an open-circuit failure occurs in the back-up analog output circuit 40 or 38, the diode string 72 or 70 will provide an alternate current path for current to flow through the actuator 74 and return to the on-line analog output circuit 38 or 40. This feature also permits one of the analog output circuits 38 or 40 and the corresponding surge withstand circuit 63 to be removed for maintenance while the remaining analog output circuit 40 or 38 can be used for control of the actuator 74.

The many features and advantages of the present invention are apparent from the detailed specification, and thus it is intended by the appended claims to cover all such features and advantages of the analog output network which fall within the true spirit and scope of the invention. Further, since numerous modifications and changes will readily occur to those skilled in the art, it is not desired to limit the invention to the exact construction and operation illustrated and described, accordingly, all suitable modifications and equivalents may be resorted to, falling within the scope and spirit of the invention. For example, while only two analog output circuits are illustrated in FIG. 1 and described above, it is possible to provide additional redundancy by including three or more analog output circuits with corresponding controllers and diode strings.

What we claim is:

1. An analog output network for controlling an actuator in dependence upon an input signal received from a sensor, comprising:
    control means, operatively connected to the sensor, for providing control signals in dependence upon the input signal;
    analog output circuits, each of said analog output circuits comprising:
        actuation means, operatively connected to said control means, for generating an analog output signal in dependence upon one of the control signals;
        internal loop means, operatively connected to said actuation means, for outputting the analog output signal and providing a current path; and
        loop sensing means, operatively connected to said internal loop means, said actuation means and said control means, for generating a feedback signal in dependence upon electrical current flow in the current path provided by said internal loop means, and
    external loop means, operatively connected to said analog output circuits and the actuator, for providing alternate current paths, the current path provided by said internal loop means in each of said analog output circuits being connected in parallel with one of the alternate current paths.

2. An analog output network as recited in claim 1, wherein said external loop means produces a first voltage drop and the electrical current flow in said internal loop means in each of said analog output circuits produces a second voltage drop lower than the first voltage drop.

3. An analog output network as recited in claim 1, wherein said control means provides a communication path for information based on the feedback signal from at least one of said analog output circuits to at least another one of said analog output circuits.

4. An analog output network as recited in claim 1, wherein said control means comprises:
    first and second controllers, operatively connected to the sensor and said analog output circuits, for providing demand signals in dependence upon the input signal, and pulse signals, one of said first and second controllers being in an on-line mode; and
    controller selector means for enabling and identifying one of said first and second controllers as an on-line controller, comprising:
        status means, operatively connected to said first and second controllers, for outputting a status signal to said second controller based on the demand signal output by said first controller;
        first enable means, operatively connected to said status means and a first one of said analog output circuits, for outputting a first enable signal to the first one of said analog output circuits when said first controller is in the on-line mode; and
        second enable means, operatively connected to said first enable means, said status means and a second one of said analog output circuits, for outputting a second enable signal to the second one of said analog output circuits when said first controller is not in the on-line mode.

5. An analog output network as recited in claim 4, wherein said status means comprises a monostable circuit operatively connected to said first and second controllers,
    wherein said first enable means comprises at least one inverter operatively connected to said status means and the first one of said analog output circuits, and
    wherein said second enable means comprises an enable signal inverter operatively connected to the at least one inverter.

6. An analog output network as recited in claim 1, wherein said control means comprises:
    first and second controllers, operatively connected to the sensor, for generating first and second demand signals, first and second control signals and first and second pulse signals, respectively; and
    controller selector means for enabling and identifying one of said first and second controllers as an on-line controller, and comprising first and second selector circuits operatively connected to said first and second controllers and said analog output circuits, each of the first and second selector circuits comprising:
        a controller status circuit, operatively connected to a corresponding controller, for indicating that the corresponding controller is operating normally in dependence upon the pulse signal and the control signal generated by the corresponding controller;
        on-line selection means for indicating that the corresponding controller is selected to be in the on-line mode;
        a first AND gate operatively connected to said controller status circuit and said on-line selection means;
        a first inverter, operatively connected to said controller status circuit, for outputting a status signal for the corresponding controller to a non-corresponding controller;
        a second AND gate operatively connected to said controller status circuit and to receive the status signal for the non-corresponding controller;
        an OR gate having inputs operatively connected to said first and second AND gates and having an output; and
        a second inverter operatively connected to the output of said OR gate, the inputs of said OR gate in the other selector circuit of said controller selector means, the non-corresponding controller and a corresponding one of said analog output circuits.

7. An analog output network as recited in claim 1, wherein said actuation means comprises:

a pulse width modulator, operatively connected to said control means and said loop sensing means, for producing a modulation signal in dependence upon one of the control signals;

a transformer, operatively connected to said pulse width modulator, for outputting an internal analog signal in dependence upon the modulation signal; and a rectifier-filter, operatively connected to said transformer and said internal loop means, for producing the analog output signal from the internal analog signal.

8. An analog output network as recited in claim 1, wherein said internal loop means comprises:

a resistor connected to said actuation means, said loop sensing means and said external loop means; and a diode, connected in series with said resistor and connected to said actuation means and said external loop means.

9. An analog output network as recited in claim 8, wherein said loop sensing means comprises an amplifier having inputs, each of the inputs connected to one end of said resistor, and an output connected to said control means and said actuation means.

10. An analog output network as recited in claim 1, wherein said external loop means comprises diode strings, each of the diode strings connected to a corresponding one of the analog output circuits and two of the diode strings connected to opposite ends of the actuator.

11. An analog output network in an integrated control system for a pressurized light water nuclear power system, said network controlling an actuator in the nuclear power system in dependence upon an input signal received from a sensor, said network comprising:

first and second controllers, operatively connected to the sensor, each generating a demand signal in dependence upon the input signal;

controller selector means, operatively connected to said first and second controllers, for indicating to said controllers which of said controllers is in an on-line mode and which is in a back-up mode;

first and second analog output circuits, each comprising:

first and second output terminals;

actuation means, operatively connected to said controller selector means and one of said first and second controllers, for outputting an actuation signal at first and second outputs in response to the demand signal from the one of said first and second controllers;

a diode connected between the first and second outputs of said actuation means and to the first output terminal; and a resistor connected to said diode and the second output terminal, an expected voltage drop occurring when a normal operating current flows from the second output terminal through said said resistor and said diode to the first output terminal; and feedback means, operatively connected to said resistor, said actuation means and the one of said first and second controllers, for outputting a feedback signal indicating current flow through said resistor;

a first diode string having a first end connected to the actuator and the first output terminal of said first analog output circuit, and a second end connected to the second output terminal of said first analog output circuit and the first output terminal of said second analog output circuit, and having a first diode string voltage drop from the second end to the first end, the first diode string voltage drop being greater than the expected voltage drop; and a second diode string having a first end connected to the second end of said first diode string, the second output terminal of said first analog output circuit and the first output terminal of said second analog output circuit, and a second end connected to the actuator and the second output terminal of said second analog output circuit, and having a second diode string voltage drop from the second end to the first end, the second diode string voltage drop being greater than the expected voltage drop.

12. An analog output network as recited in claim 11, wherein at least one of said first and second diode strings comprises series-connected diodes, each of the series-connected diodes having a forward bias voltage from the second end to the first end of the at least one of said first and second diode strings.

13. An analog output network as recited in claim 12, wherein the at least one of said first and second diode strings comprises high-power, reverse bias diodes.

14. An analog output network as recited in claim 11, wherein at least one of said first and second diode strings comprises:

a zener diode, connected to one of the first and second ends of the at least one of said first and second diode strings, having a reverse bias with respect to current flow from the second end to the first end; and a forward-biased diode, connected to said zener diode and the other of the first and second ends, having a forward bias with respect to the current flowing from the second end to the first end.

15. An analog output network as recited in claim 11, wherein said first controller outputs a pulse signal, and wherein said controller selector means comprises:

status means, operatively connected to said first and second controllers, for outputting a status signal to said second controller based on the pulse signal output by said first controller;

first enable means, connected to said status means and said first analog output circuit, for outputting a first enable signal to said first analog output circuit when said first controller is in the on-line mode; and second enable means, connected to said first enable means, said status means and said second analog output circuit, for outputting a second enable signal to said second analog output circuit when said first controller is not in the on-line mode.

16. An analog output network as recited in claim 15, wherein said controller selector means further comprises mode selection means, connected to said first and second enable means, for selecting the on-line mode for one of said first and second controllers.

17. An analog output network as recited in claim 15, wherein said status means comprises a monostable circuit operatively connected to said first and second controllers, wherein said first enable means comprises at least one inverter operatively connected to said status means and said first analog output circuit, and wherein said second enable means comprises an enable signal inverter operatively connected to the at least one inverter.

18. An analog output network as recited in claim 11, wherein each of said first and second controllers further generate control and pulse signals, and wherein said controller selector means comprises first and second selector circuits operatively connected to said first and second controllers and said first and second analog output circuits, respectively, each of the first and second selector circuits comprising:
- a controller status circuit, operatively connected to a corresponding controller, for indicating that the corresponding controller is operating normally in dependence upon the control and pulse signals generated by the corresponding controller;
- on-line selection means for indicating that the corresponding controller is selected to be in the on-line mode;
- a first AND gate operatively connected to said controller status circuit and said on-line selection means;
- a first inverter, operatively connected to said controller status circuit, for outputting the status signal for the corresponding controller to a non-corresponding controller;
- a second AND gate operatively connected to said controller status circuit and to receive the status signal for the non-corresponding controller;
- an OR gate having inputs operatively connected to said first and second AND gates and having an output; and
- a second inverter, operatively connected to the output of said OR gate, the inputs of said OR gate in the other selector circuit of said control selector means, the non-corresponding controller and a corresponding one of said first and second analog output circuits.

19. An analog output network as recited in claim 11, wherein said feedback means comprises an electrically isolated amplifier, connected to said resistor, said actuation means and one of said first and second controllers, for generating the feedback signal in dependence upon a resistor voltage drop across said resistor.

20. An analog output network as recited in claim 11, wherein said actuation means comprises:
- a pulse width modulator, operatively connected to one of said first and second controllers, for generating a modulation signal in response to the demand signal from the one of said first and second controllers;
- a transformer, operatively connected to said pulse width modulator, for outputting an internal analog signal in dependence upon the modulation signal; and
- a rectifier-filter, operatively connected to said transformer and the first and second outputs of said actuation means, for generating the actuation signal by filtering the internal analog signal.

21. An analog output network as recited in claim 11, wherein each of said analog output circuits further comprises a surge withstand circuit operatively connected to said diode, said resistor and said first and second output terminals.

22. An analog output network for controlling an actuator in dependence upon an input signal received from a sensor, comprising:
- controllers, operatively connected to the sensor, each of said controllers generating a demand signal in dependence upon the input signal, a control signal and a pulse signal;
- controller selector means, operatively connected to said controllers, for generating status signals indicating whether each of said controllers is operating normally and enable signals indicating which of said controllers is in an on-line mode and which of said controllers is in a back-up mode;
- analog output circuits, each of said analog output circuits, operatively connected to said controller selector means and one of said controllers, providing a current path for an analog signal supplied to the actuator; and
- external loop means, operatively connected to said analog output circuits and the actuator, for providing alternate current paths, each of the alternate current paths being connected in parallel with the current path provided by a corresponding one of said analog output circuits.

23. An analog output network as recited in claim 22, wherein said controllers and said analog output circuits comprise first and second controllers and first and second analog output circuits, each of said first and second controllers operatively connected to the sensor and said controller selector means, said first controller further operatively connected to said first analog output circuit and said second controller further operatively connected to said second analog output circuit, and wherein said controller selector means comprises first and second selector circuits operatively connected to said first and second controllers and said first and second analog output circuits, respectively, each of the first and second selector circuits comprising:
- a controller status circuit, operatively connected to a corresponding controller, for indicating that the corresponding controller is operating normally in dependence upon the pulse signal and the control signal generated by the corresponding controller;
- on-line selection means for indicating that the corresponding controller is selected to be in the on-line mode;
- a first AND gate operatively connected to said controller status circuit and said on-line selection means;
- a first inverter, operatively connected to said controller status circuit, for outputting the status signal for the corresponding controller to a non-corresponding controller;
- a second AND gate operatively connected to said controller status circuit and to receive the status signal for the non-corresponding controller;
- an OR gate having inputs operatively connected to said first and second AND gates and having an output; and
- a second inverter, operatively connected to the output of said OR gate, the input of said first OR gate in the other selector circuit of said controller selector means, the non-corresponding controller and a corresponding one of said first and second analog output circuits, for producing the enable signal for a corresponding analog output circuit.

24. An analog output network as recited in claim 22, wherein said external loop means produces a first voltage drop and the electrical current flow in said internal loop means in each of said analog output circuits produces a second voltage drop lower than the first voltage drop.

25. An analog output network as recited in claim 22, wherein said controllers and said controller selector means provides a communication path for information based on the feedback signal from at least one of said analog output circuits to at least another one of said analog output circuits.

26. An analog output network as recited in claim 22, wherein each of said analog output circuits comprises:
   actuation means operatively connected to said controller selector means and a corresponding controller, for generating an analog output signal in dependence upon the demand signal from the corresponding controller;
   internal loop means, operatively connected to said actuation means, for outputting the analog output signal and providing a current path; and
   loop sensing means, operatively connected to said internal loop means, said actuation means and the corresponding controller, for generating a feedback signal in dependence upon electrical current flow in the current path provided by said internal loop means.

27. An analog output network in an integrated control system for a pressurized light water nuclear power system, said network controlling an actuator in the nuclear power system in dependence upon an input signal received from a sensor, said network comprising:
   first and second controllers, operatively connected to receive the input signal, each of said controllers generating a demand signal, a control signal and a pulse signal;
   controller selector means, operatively connected to said first and second controllers, for providing a status signal indicating to each of said first and second controllers whether said second and first controllers, respectively, are operating normally, and enable signals indicating which of said controllers is in an on-line mode and which of said controllers is in a back-up mode, said controller selector means comprising first and second selector circuits operatively connected to said first and second controllers, respectively, each of the first and second selector circuits comprising:
      a controller status circuit, operatively connected to a corresponding controller, for indicating that the corresponding controller is operating normally in dependence upon the pulse signal and the control signal generated by the corresponding controller;
      on-line selection means for indicating that the corresponding controller is selected to be in the on-line mode;
      a first AND gate operatively connected to said controller status circuit and said on-line selection means;
      a first inverter, operatively connected to said controller status circuit, for outputting the status signal to a non-corresponding controller;
      a second AND gate operatively connected to said controller status circuit and to receive the status signal for the non-corresponding controller;
      an OR gate having inputs operatively connected to said first and second AND gates and having an output; and
      a second inverter, operatively connected to the output of said second OR gate, the inputs of said first OR gate in the other selector circuit of said controller selector means and the non-corresponding controller, for producing a corresponding enable signal;
   first and second analog output circuits, operatively connected to said first and second controllers and said second inverter in the first and second selector circuits, respectively, of said controller selector means, for providing first and second current paths for an analog signal supplied to the actuator, respectively; and
   external loop means, operatively connected to said analog output circuits and the actuator, for providing first and second alternate current paths connected in parallel with the first and second current paths provided by said first and second analog output circuits, respectively.

28. An analog output network as recited in claim 27, wherein each of said first and second analog output circuits comprises:
   actuation means, operatively connected to said first and second controllers and said controller selector means, for generating an actuation signal at first and second outputs in response to the respective demand and enable signals;
   first and second output terminals operatively connected to said external loop means;
   a diode connected between the first and second outputs of said actuation means and to the first output terminal;
   a resistor connected to said diode and the second output terminal, an expected voltage drop occurring when a normal operating current flows from the second output terminal through said resistor and said diode to the first output terminal; and
   feedback means, operatively connected to said resistor and a corresponding one of said first and second controllers, for outputting a feedback signal indicating current flow in said resistor, and
   wherein the alternate current path in said external loop means has an external voltage drop which is greater than the expected voltage drop.

* * * * *